US012771447B2

(12) United States Patent
Buscaino et al.

(10) Patent No.: US 12,771,447 B2
(45) Date of Patent: Oct. 20, 2026

(54) METHOD AND APPARATUS FOR WAVELENGTH DIVERSITY IN FREE-SPACE OPTICAL COMMUNICATIONS

(71) Applicant: CIENA CORPORATION, Hanover, MD (US)

(72) Inventors: Brandon Taylor Buscaino, Palo Alto, CA (US); Mohammad Ebrahim Mousa Pasandi, Ottawa (CA); Kim Byron Roberts, Ottawa (CA)

(73) Assignee: CIENA CORPORATION, Hanover, MD (US)

( * ) Notice: Subject to any disclaimer, the term of this patent is extended or adjusted under 35 U.S.C. 154(b) by 376 days.

(21) Appl. No.: 18/483,946

(22) Filed: Oct. 10, 2023

(65) Prior Publication Data

US 2024/0348333 A1 Oct. 17, 2024

Related U.S. Application Data

(60) Provisional application No. 63/496,239, filed on Apr. 14, 2023.

(51) Int. Cl.
*H04B 10/11* (2013.01)
*H04B 10/50* (2013.01)
*H04B 10/516* (2013.01)

(52) U.S. Cl.
CPC ........... *H04B 10/11* (2013.01); *H04B 10/506* (2013.01); *H04B 10/5161* (2013.01)

(58) Field of Classification Search
CPC .............................. H04B 10/11; H04B 10/506
See application file for complete search history.

(56) References Cited

U.S. PATENT DOCUMENTS 9,048,950 B2 6/2015 Chen et al.
9,209,815 B1 * 12/2015 Taylor ........................ H03L 7/06
10,701,280 B1 * 6/2020 Lee ........................ G02B 23/16
(Continued)

OTHER PUBLICATIONS

"Amendment Under Article 34 for Appln. No. PCT/US2024/023845", Jul. 18, 2024, 7 pages.
(Continued)

*Primary Examiner* — Tanya T Motsinger
(74) *Attorney, Agent, or Firm* — Guntin & Gust, PLC; Kenneth S. Kwan

(57) ABSTRACT

A system that incorporates the subject disclosure may include, for example, receiving optical signals, wherein the optical signals are generated by a transmitter, wherein the transmitter generates multiple optical wavelengths, wherein the transmitter modulates the multiple optical wavelengths from digital input data to create correlated optical signals, and wherein the transmitter transmits the correlated optical signals across a transmission medium having characteristics of a turbulent channel, converting of the optical signals to electrical signals, processing of the electrical signals in a modem to produce output data and additional information, supplying the additional information to a processor, and based on the additional information, the processor generating one or more control signals directed to a phase alignment stage for compensating turbulent effects experienced by the optical signals while propagating through the turbulent channel. Additional embodiments are disclosed.

20 Claims, 13 Drawing Sheets

(56) References Cited

U.S. PATENT DOCUMENTS

| | | | | |
|---|---|---|---|---|
| 10,979,148 | B1 * | 4/2021 | Zhou | H04J 14/06 |
| 12,487,336 | B2 * | 12/2025 | Lu | G01S 7/4972 |
| 2010/0021166 | A1 * | 1/2010 | Way | H04J 14/0246 398/79 |
| 2012/0308227 | A1 * | 12/2012 | Komaki | H04B 10/25073 398/25 |
| 2013/0156424 | A1 * | 6/2013 | Youn | H04B 10/614 398/38 |
| 2013/0315604 | A1 | 11/2013 | Lopresti et al. | |
| 2013/0343751 | A1 * | 12/2013 | Mamyshev | H04B 10/615 398/202 |
| 2014/0169802 | A1 * | 6/2014 | Magri | H04B 10/541 398/183 |
| 2015/0229409 | A1 * | 8/2015 | Chen | H04B 10/6161 398/208 |
| 2016/0182155 | A1 * | 6/2016 | Taylor | H04B 10/613 398/208 |
| 2016/0182219 | A1 * | 6/2016 | Taylor | H04B 10/2575 398/115 |
| 2018/0367220 | A1 * | 12/2018 | Nomura | H04B 10/0795 |
| 2019/0199443 | A1 * | 6/2019 | Zamani | H04B 10/616 |
| 2019/0326998 | A1 * | 10/2019 | Chen | H04L 27/2096 |
| 2020/0015250 | A1 * | 1/2020 | Yang | H04B 7/0619 |
| 2021/0072616 | A1 * | 3/2021 | Zhang | G02F 1/365 |
| 2021/0083779 | A1 * | 3/2021 | Arikawa | H04B 10/118 |
| 2021/0119710 | A1 * | 4/2021 | Sakib | H04B 10/614 |
| 2022/0376727 | A1 * | 11/2022 | van Houtum | H04B 1/18 |
| 2023/0012584 | A1 * | 1/2023 | Matsuda | H04J 14/02 |
| 2023/0094424 | A1 * | 3/2023 | Zhou | H04B 10/541 398/43 |
| 2023/0283394 | A1 * | 9/2023 | Kelly | H04B 10/614 398/83 |
| 2023/0318667 | A1 * | 10/2023 | Frenger | H04B 7/063 370/330 |
| 2024/0348333 | A1 * | 10/2024 | Buscaino | H04B 10/506 |
| 2025/0253955 | A1 * | 8/2025 | Zhou | H04B 10/615 |
| 2025/0309995 | A1 * | 10/2025 | Sasaki | H04B 10/613 |

OTHER PUBLICATIONS

Abadi , et al., "FSO Detection Using Differential Signaling in Outdoor Correlated-Channels Condition", IEEE Photonics Technology Letters, vol. 28, No. 1, Jan. 1, 2016, Jan. 1, 2016, 4 pages.

Al-Habash, M. A., et al., "Mathematical model for the irradiance probability density function of a laser beam propagating through turbulent media", 2001 Society of Photo-Optical Instrumentation Engineers; Opt. Eng. 40(8), Aug. 2001, 9 pages.

Andrews , et al., "Laser Beam Propagation through Random Media", Second Edition, 2005, 808 pgs.

Belmonte , et al., "Capacity of coherent free-space optical links using diversity-combining techniques", Jul. 20, 2009 / vol. 17, No. 15 / Optics Express 12601, Jul. 10, 2009, 11 pages.

Belmonte, Aniceto , et al., "Sequential Optimization of Adaptive Arrays in Coherent Laser Communications", Journal of Lightwave Technology, vol. 31, No. 9, May 1, 2013, 5 pages.

Billault , et al., "Free space optical communication receiver based on a spatial demultiplexer and a photonic integrated coherent combining circuit", vol. 29, No. 21 / Oct. 11, 2021 / Optics Express 33134, Oct. 11, 2021, 10 pages.

Choutagunta , et al., "Adapting Mach-Zehnder Mesh Equalizers in Direct-Detection Mode-Division-Multiplexed Links", Journal of Lightwave Technology, vol. 38, No. 4, Feb. 15, 2020, Feb. 15, 2020, 13 pages.

Djordjevic , "Adaptive Modulation and Coding for Free-Space Optical Channels", vol. 2, No. 5/May 2010/J. Opt. Commun. Netw. 221, May 1, 2010, 9 pages.

Freier, Christian , et al., "Scalable all-fiber coherent beam combination using digital control", Applied Optics, vol. 61, No. 15, May 20, 2022, 6 pages.

Fried, David L., "Optical Heterodyne Detection of an Atmospherically Distorted Signal Wave Front", Proceedings of the IEEE, vol. 55, No. 1, Jan. 1967, 11 pages.

Geisler, David J., et al., "Multi-aperture digital coherent combining for free-space optical communication receivers", Optics Express 12661; Optical Communications Technology, Massachusetts Institute of Technology Lincoln Laboratory, Jun. 1, 2016, 11 pages.

Hernandez, Daniel Malacara, et al., "Near-Earth Laser Communications", Optical Science and Engineering, 2021, 466 pages.

Kolmogorov, A.N. , "The local structure of turbulence in incompressible viscous fluid for very large Reynolds numbers", Downloaded Jan. 24, 2023, 5 pages.

Larsson , et al., "Coherent combining of low-power optical signals based on optically amplified error feedback", https://doi.org/10.1364/OE.456188 vol. 30, No. 11 / May 23, 2022 / Optics Express 19441, May 23, 2022, 15 pages.

Milanizadeh , et al., "Establishing Multiple Chip-to-Chip Orthogonal Free-Space Optical Channels using Programmable Silicon Photonics Meshes", 2022 IEEE Photonics Society Summer Topicals Meeting Series (SUM) | 978-1-6654-3489-8/22/ © 2022 IEEE | DOI: 10.1109/SUM53465.2022.9858129, 2022, 2 pages.

Morichetti , et al., "Mitigation of Atmospheric Turbulence in an Optical Free Space Link with an Integrated Photonic Processor", OFC 2023 © Optica Publishing Group 2023, Mar. 5, 2023, 3 pages.

Navidpour , et al., "BER Performance of Free-Space Optical Transmission with Spatial Diversity", IEEE Transactions on Wireless Communications, vol. 6, No. 8, Aug. 2007, Aug. 1, 2007.

Niu, Mingbo , et al., "MIMO Architecture for Coherent Optical Wireless Communication: System Design and Performance", J. Opt. Commun. Netw., vol. 5, No. 5, May 2013, 10 pages.

Popoola, et al., "Error performance of terrestrial free space optical links with subcarrier time diversity", IET Commun., 2012, vol. 6, Iss. 5, pp. 499-506 doi: 10.1049/iet-com.2011.0107, 2012, 8 pages.

Purvinskis, Robert , et al., "Multiple-wavelength free-space laser communications", Proceedings of Spie; Event: High-Power Lasers and Applications, San Jose, CA, United States, 2003, 9 pages.

Rao, Chenjie , et al., "Toward Practical Digital Phase Alignment for Coherent Beam Combining in Multi-Aperture Free Space Coherent Optical Receivers", IEEE Access, Nov. 4, 2020, 11 pages.

Thi, Mat Nguyen, et al., "Seven-Aperture Direct-Detection Receiver for Free-Space Optical Communication Systems", OFC 2022; Optica Publishing Group 2022, Downloaded Oct. 12, 2022, 3 pages.

Tsiftsis, Theodoros A., et al., "Optical Wireless Links with Spatial Diversity over Strong Atmospheric Turbulence Channels", IEEE Transactions on Wireless Communications, vol. 8, No. 2, Feb. 2009, 7 pages.

Tyson , "Principles of Adaptive Optics—Third Edition", © 2011 by Taylor and Francis Group, LLC CRC Press is an imprint of Taylor & Francis Group, an Informa business International Standard Book No. 13: 978-1-4398-0859-7, 2011, 318 pages.

Weerackody, V. , et al., "Wavelength Correlation in Free Space Optical Communication Systems", IEEE Xplore, Downloaded Nov. 29, 2022, 6 pages.

Yang, Yan , et al., "Multi-aperture all-fiber active coherent beam combining for free-space optical communication receivers", Optics Express 27519; vol. 25, No. 22, Oct. 20, 2017, 14 pages.

Young, C. Y., et al., "Two-frequency mutual coherence function of a Gaussian beam pulse in weak optical turbulence: an analytic solution", Applied Optics, vol. 35, No. 33, Nov. 20, 1996, 5 pages.

Zheng, Donghao , et al., "Performance enhancement of free-space optical communications under atmospheric turbulence using modes diversity coherent receipt", Optics Express 28879, vol. 26, No. 22, Oct. 24, 2018, 12 pages.

Notification of Transmittal of International Preliminary Report on Patent Ability for PCT/US2024/023845, mailed Dec. 10, 2024, 24 pp.

"International Search Report and Written Opinion for Application No. PCT/US2024/023845", Jul. 8, 2024, 13 pages.

* cited by examiner

METHOD AND APPARATUS FOR WAVELENGTH DIVERSITY IN FREE-SPACE OPTICAL COMMUNICATIONS

CROSS REFERENCE TO RELATED APPLICATIONS

The present application claims the benefit of priority to U.S. Provisional Application No. 63/496,239 filed on Apr. 14, 2023, which is hereby incorporated herein by reference in its entirety.

FIELD OF THE DISCLOSURE

The subject disclosure relates to a method and apparatus for wavelength diversity in free-space optical communications.

BACKGROUND

Free-Space Optical Communications

Satellite Constellations

In the past decade, there has been a significant rise in the total number of satellites being launched into low-earth orbit (LEO) with the purpose of serving as nodes in a globe-spanning communications network. Leading companies are SpaceX, Amazon, and Telesat. These satellites have initially been provisioned with RF links, but in late 2022, have had their optical backbone links turned on.

The optical challenges associated with space-to-space links are somewhat less severe than optical links that traverse atmosphere due to the lack of atmospheric scintillation. It appears that satellite constellation operators are focused on bringing coherent pluggables into space to counteract high beam spread loss, boost data rate, and leverage a maturing market. It appears 100 Gb/s optical links is the primary focus for near-future deployment.

There are other purely space-based applications, specifically NASA's Laser Communications Relay Demonstration (LCRD) is intended to scope out a possible laser relay system from geosynchronous satellites to the moon and beyond (spacecraft launched further into the solar system).

Aerial Terminals

Recently, several companies such as Alphabet (Sonora, Loon), Meta (Aquila), and Lockheed Martin, have explored the use of optical links employed on high-altitude vehicles (HAVs) above the worst atmospheric turbulence. In some cases, the intended purpose is to mimic LEO satellite constellations to provide internet services to ground customers, with more flexible provisioning. Other applications are motivated by increasing the bandwidth of aircraft passenger internet access, whereby an aircraft would use an optical link to connect to a LEO satellite, instead of directly to the ground. Some of these efforts have been postponed or outright cancelled.

While aerial-to-aerial links can avoid most of the challenges associated with optical turbulence, new practical problems are introduced, such as aircraft vibration effects on pointing and tracking, network provisioning of limited flight-time aircraft, and the need for ground-based connectivity. Aerial-to-ground optical links must traverse the atmosphere at some point, introducing an additional bandwidth bottleneck to be discussed in the "Hybrid Optical Links" section below.

Terrestrial Terminals

Ground-based optical links are frequently discussed in the context of backhaul applications for last-mile customers or for difficult terrain where laying fiber is impractical. Shorter optical links may also be used for areas with high RF activity or latency/security-constrained environments. Typically, terrestrial links are between 500 m and 5 km, depending on the environment and operate in the near-infrared. Since atmospheric turbulence is highest near the ground, turbulence mitigation techniques are typically employed, increasing the cost of these systems and positioning them as a niche market. Commercial products have been available for several decades and have recently scaled to 10 Gb/s links.

Hybrid Optical Links

Recently, there has been renewed interest in optical links that traverse multiple of these domains, such as ground-to-air links supporting HAV constellations or ground-to-LEO optical links supporting LEO satellite constellations. In particular, LEO-to-ground optical links may become more prominent in the coming years to address the increase in space-based cross-sectional bandwidth of the constellations. Current traffic-routing solutions utilize RF downlinks from LEO satellites, which are limited by size, weight, and power (SWaP) constraints to around 500 Mb/s.

There are also additional applications that require hybrid optical links besides constellations. Currently, LEO and GEO satellites generate significant amounts of data that must be transmitted to the ground. NASA's Terabyte Infrared Delivery (TBIRD) program is intended to address this bottleneck. However, recent experimental demonstrations have had limited success at transferring data at speeds faster than 5-10 Gb/s aggregate bit rates.

Challenges of Free-Space Optical Communications

Pointing, Acquisition, and Tracking (PAT)

Pointing and tracking between optical terminals has been and continues to be a challenge for modern Free-Space Optical (FSO) systems. Complex control algorithms are required to ensure that the optical beam profile from the transmitter is translated to a receiver beam profile that overlaps with the receiver aperture. While problems plague practical systems, there are well-known and studied techniques for all ranges of free-space optical links.

Severe Weather

Weather such as rain, clouds, or fog, can have deleterious effects on a free-space optical link. Frequently, severe weather causes optical links to go down regardless of the amount of optical power available at the transmitter. In these cases, a slower RF backup link is often required. In some cases, networks can be designed to route signals through multiple other paths if one optical link is unavailable, but to ensure a fixed reliability rate, redundant transmitter and receiver terminals are required. This technique is an example of spatial diversity that will be discussed in the "Turbulence Mitigation Techniques" section below.

Clear-Air Turbulence

Clear-air turbulence is among a class of atmospheric conditions where attenuation of and optical signal is relatively low, compared to vacuum, but atmospheric effects due to air movement, temperature, and pressure, distorts the optical signals in various ways that make reception of the signal difficult. Frequently, clear-air turbulence results in fading, whereby the received intensity of an optical signal decreases rapidly below the receiver sensitivity due to multi-path interference effects in the atmosphere. The observed statistical nature of the received optical intensity through the atmosphere is the basis for many theoretical models.

The most prominent theory of atmospheric turbulence is Kolmogorov's Theory of Turbulence, where the atmosphere is treated as a viscous liquid undergoing turbulent flow.

Furthermore, the atmosphere is assumed to be composed of eddies of varying sizes, and in thermal equilibrium there is a distribution of eddies sizes, which, given various other parameters such as wind speed and pressure, determine the total effects of refraction and interference of an optical signal as it traverses the atmosphere. Specifically, the index of refraction structure function, which describes the correlation of the refractive index in the receiver plane, is $$\Phi_n(K) = 0.033C_n^2K^{-11/3},$$

where K is the spatial frequency and $$C_n^2$$

is the refractive index structure constant which describes the overall strength of the turbulence. This theory has led to the theoretical and experimental exploration of the effects of atmosphere on optical transmission, including the optical phase. Additional models have been built up on this theory, such as the Gamma-Gamma model, which will be used later, where atmospheric turbulence is characterized primarily by the size of the smallest and largest atmospheric eddies. These length scales, derived from $$C_n^2,$$

are then used to predict the distribution of the intensities at the receiver plane.

Finally, in the context of free-space optical heterodyne receivers, statistical information about the phase of the received optical signal can be ascertained. Specifically, the coherence length is defined roughly as the length in the receiver plane between points where the phase of the optical signal is well-correlated, which is critical for coherent optical communications systems. The coherence length is related to the link length, wavelength, and turbulence strength:

$$r_0 = 1.68(C_n^2LK^2)^{-3/5},$$

valid for a plane wave.

Turbulence Mitigation Techniques

Optical Techniques

Fade Threshold

One technique to avoid intensity fading of an optical signal is to send additional optical power from the transmitter aperture. The ratio of average received optical power to the receiver sensitivity is called the fade threshold. Increasing the fade threshold decreases the probability of a fading event dropping the received signal intensity below the receiver sensitivity, resulting in a link outage. The obvious drawbacks to this method are a decrease in efficiency, decrease in signal to noise ratio (SNR) and potential limitations due to eye-safety concerns. Importantly, some optical links under conditions of high turbulence can experience very deep fades, on the order of tens of dBs, much higher than practical fad thresholds.

Aperture Averaging

Another technique by which atmospheric turbulence can be mitigated is aperture averaging. By increasing the aperture size, additional light is collected and combined in the receiver waveguide. For coherent communications, increasing the aperture size within the coherence length increases the SNR, while aperture averaging is limited past the coherence length.

Adaptive Optics

One compensatory optical technique is adaptive optics, whereby the received optical wavefront is measured and compensated so that the discretized wavefront is coherently summed in the receiving waveguide. By sensing the wavefront, such as with a Shack-Hartmann wavefront sensor, the relative phases of the pixelized wavefront can be estimated and corrected. Necessarily, the use of adaptive optics requires constant temporal updates to the wavefront correcting element as the atmosphere changes.

Networking Techniques

Repetition Coding and ARQ

For many FSO systems, the primary impairment is temporal fading. Depending on the length of the link and the strength of the turbulence, mean fading times can occur on the time scales of tens of microseconds to 10 s of milliseconds[4]. Some systems implement automatic repeat requests (ARQ) so that if packets are dropped in the FSO link, they may be transmitted. Similarly, some links shift the complexity to signal coding and introduce temporal redundancy with various type of repetition coding. In the latter case, the statistical nature of fading is used to reduce the likelihood of an outage, while in the former, fading is dealt with by a higher protocol. Both methods significantly increase the latency of the FSO link.

Adaptive Coding

Some FSO systems utilize adaptive coding to adapt to the unpredictable FSO channel. Frequently in these implementations, a RF back-channel is used to convey information about the FSO channel, which is used to reduce or increase the modulation format order. This requires synchronization at both transmitter and receiver ends as well as a reliable estimator for the channel. In addition, this method is not necessarily compatible with fixed rate networks where optical links are expected to be able to support a specific maximum data rate at any given time.

Diversity-Based Techniques

A method of decreasing the outage probability of and FSO link is by utilizing transmitter or receiver diversity. In its simplest form, identical or similar information is sent across multiple independent of sufficiently uncorrelated channels to increase the probability that the information is successfully transmitted and received.

Time Diversity

A form of diversity is temporal diversity to decrease the outage probability. While repetition coding is an example of time-diversity, any uncorrelated channels can be used to re-transmit information. For example, a sometimes-used method is subcarrier intensity modulation (SIM) whereby different subcarriers of an intensity-modulated signal are used to transmit independent data streams. In one implementation, the same information, but time-delayed, is transmitted on each subcarrier.

Spatial Diversity

Spatial diversity techniques often leverage the spatial decorrelation of the atmosphere to reduce the likelihood of an outage and increase the BER. Various implementations use one or multiple transmit apertures focused onto one or multiple receiver apertures in either the near-field or far-field. Without loss of generality, we consider receiver diversity schemes, though the methods can also be used for a combination of receiver and transmitter diversity schemes. If multiple copies of the transmitted optical signal are received, then the information can be gathered and processed to determine the original signal. Some common methods are: maximal ratio combining (MRC), equal gain combining (EGC), or selective combining (SC). Transmitter and receiver methods may use multiple separate apertures or utilize a single aperture that can transmit or receive multiple spatial modes, such as coupling into few-mode fiber. These methods can be used with both coherent optical links as well as optical links based on direct detection. The methods are described briefly below:

MRC: The received signals are combined optimally to maximize the desired metric, often SNR. If there are amplifying elements in the receiver combining architecture, the noise from those sources, as well as other noise sources, are estimated and used for the MRC algorithm.

EGC: Each of the received signals is amplified to a similar value and either coherently or incoherent combined, depending on the detection method. Generally, EGC underperforms MRC.

SC: The received signal with either the highest power or highest SNR is selected from all of the receivers and all other receiver outputs are ignored. Easiest to implement but lower performance.

Coherent and Noncoherent Combining

The above methods can be done in either the optical domain or the electrical domain. If the signals are combined in the optical domain, they are typically combined with interferometric devices, either concatenated Mach-Zehnder (MZ) modulators, or meshes of MZ modulators, whose relative path length differences are adjusted to align the phase of one or more received optical signals. In recent years there have been several theoretical and experimental studies of optical phase alignment algorithms for spatial diversity receivers.

Similarly, phase alignment can also occur in the electrical domain after the optical signals have been down converted. There is often more flexibility in the digital domain and FSO spatially diverse receivers have been demonstrated for both coherent and noncoherent detection methods. One downside of digital combining is that the number of independent receivers scales with the number of receiver apertures, which may or may not increase cost and complexity.

Wavelength Diversity

Like other diversity techniques, multiple wavelengths can transmit identical or similar information and traverse a unique or shared path. If the path length is long enough, then a shared path through the atmosphere can introduce decorrelation between optical wavelengths. This effect has been studied via two-frequency mutual coherence functions. Interestingly, only for very long links, such as LEO-to-ground, and high optical turbulence, can two frequencies transmitted and received through the same aperture become significantly decorrelated. For this reason, many previous wavelength diversity systems use optical wavelengths very far apart, such as 800 nm and 1550 nm to ensure decorrelation. Demonstrations of wavelength diversity have been shown for both direct detection and coherent detection-based systems where the wavelengths are separated by wavelength-selective devices, processed by separate receivers, and optimally combined. Some implementations rely on coding across multiple wavelengths of a wavelength-division multiplexed channel.

BRIEF DESCRIPTION OF THE DRAWINGS

Reference will now be made to the accompanying drawings, which are not necessarily drawn to scale, and wherein.

DETAILED DESCRIPTION

As described above, due to atmospheric fading, FSO communications links can experience power drops for long periods on the scale of communications systems (100 microseconds to 10 milliseconds). The architectures below mitigate the effect of atmospheric fading using wavelength diversity and other diversity techniques. Importantly, these techniques may be used together or separately to completely resolve or partially mitigate the effects of atmospheric turbulence. In the cases where atmospheric effects can be completely mitigated, real-time optical links can be implemented without additional ARQ layers.

Wavelength Diversity Architectures Based on Coherent Detection

Transmitting identical or similar information on two different wavelengths has a diversity advantage without, in principle, increasing the latency or increasing the number of transmitter and receiver apertures. Here we describe three FSO Communications (FSOC) architectures that leverage this performance improvement.

Note, in the following figures $\lambda_N$ represents the N'th single-wavelength source (such as a laser) while $\tilde{\lambda}_N$ represents an optical signal at the same center wavelength, $\lambda_N$, that has been modulated.

Optical Phase Alignment

Figure 1:
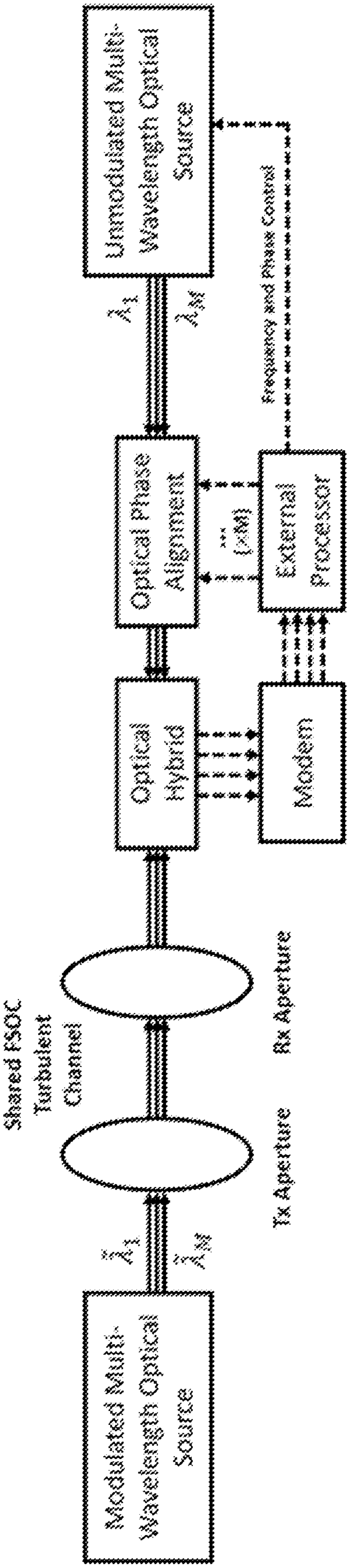
FIG. 1 is a block diagram illustrating an exemplary, non-limiting embodiment of a Coherent Multi-Wavelength Free-Space Optical Communications (FSOC) Architecture with Optical Phase Alignment in accordance with various aspects described herein.

FIG. 1 shows a wavelength-diversity FSOC architecture. Based on coherent detection and optical phase alignment. A modulated multi-wavelength source (discussed in later sections) transmits similar information on multiple wavelengths. These optical signals are transmitted across an FSOC channel via a single transmitter aperture and single receiver aperture. The modulated multi-wavelength signal is then converted into a coherent optical hybrid. The local oscillator port of the optical hybrid is seeded by an unmodulated multi-wavelength source, with significant spectral overlap with the transmitted modulated multi-wavelength source. In the optical hybrid, each of the unmodulated local oscillator wavelengths mix with the transmitted signal wavelengths, resulting in opto-electric down conversion to an electrical signal.

Due to wavelength-dependent phase variations due to atmospheric turbulence, optical path lengths, mechanical tolerance, etc. phase alignment of the local oscillator wavelengths allows for the down conversion process to generate electrical signals that sum coherently. Due to this coherent summation, the electrical signal-to-noise ratio is greater than that of any of the single wavelength signals. Importantly, the probability of a fade decreases dramatically because each wavelength experiences independent or only partially correlated turbulence, resulting in wavelength diversity.

This design uses a processor that receives input from the modem, which receives the analog electrical signals from the optical hybrid. In this architecture, the processor uses an algorithm to determine the optimal phase alignment for each of the local oscillator wavelengths. Then the processor sends electrical control signals to the optical phase alignment stage, discussed below, to align the phases of the local oscillator optical wavelengths. Moreover, the algorithms track various temporal phase effects that may occur due to turbulence, temperature, pressure, etc. so that the aligned phases remain matched to the transmitted signals. The processor also sends feedback to the local oscillator multi-wavelengths source necessary to track the per-channel optical frequencies and phases due to optical phase noise in the source, or other fast phase effects.

Electrical Phase Alignment

Figure 2:
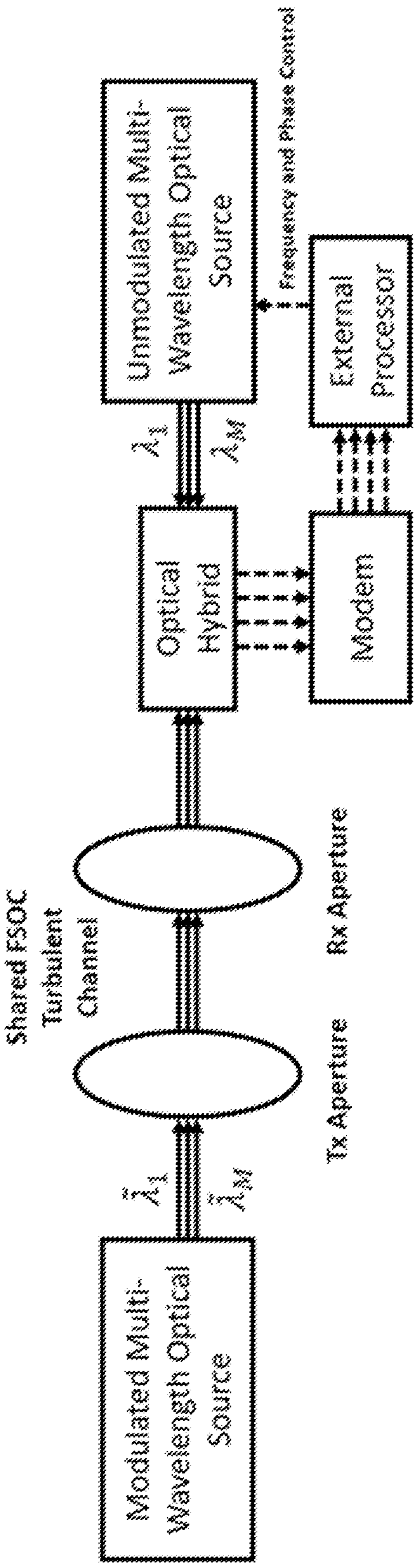
FIG. 2 is a block diagram illustrating an example, non-limiting embodiment of a Coherent Multi-Wavelength FSOC Architecture with Electrical Phase Alignment in accordance with various aspects described herein.

The phase alignment technique can also take place solely in the electric domain. FIG. 2 shows an FSOC architecture with electrical phase alignment. Here, the processor sends frequency and phase control signals for each channel to the unmodulated local oscillator multi-wavelength source.

Digital Phase Alignment

The phase alignment technique can also take place in the digital domain. For example, when the wavelengths of the Rx optical source are slightly staggered relative to the Tx optical source, the Intermediate Frequencies after optical mixing will be staggered in frequency. Digital processing can recover the phase from each of these and then a unitary transform such as a Hadamard matrix can combine the signals for decoding.

Wavelength Diversity Architectures Based on Direct Detection

Figure 3:
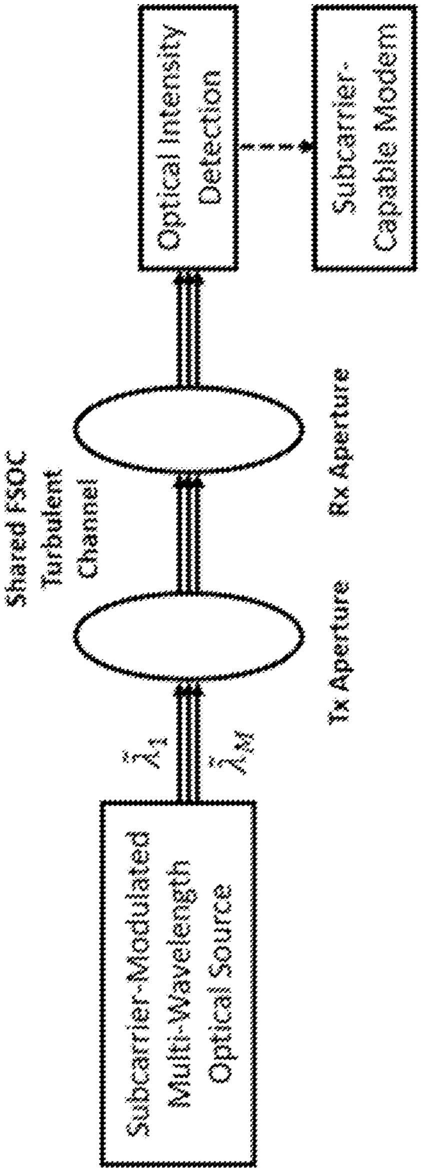
FIG. 3 is a block diagram illustrating an example, non-limiting embodiment of a Intensity Detection Subcarrier-Based Multi-Wavelength FSOC Architecture with Electrical Phase Alignment in accordance with various aspects described herein.

In another implementation, wavelength-diversity can be used in FSOC architectures based on direct detection as depicted in FIG. 3. Here, multiple wavelengths are intensity modulated with similar information, but they are then mixed with electrical tones at distinct frequencies. These wavelengths are transmitted through an FSOC channel before being detected by an optical intensity detector and the modulated wavelengths are down converted to the electrical domain. Because the signals were mixed with distinct frequencies in the transmitter, in the receiver, the signals appear as subcarriers at different frequencies. These subcarriers can be demultiplexed, phase aligned, and recombined to achieve wavelength diversity. Notably different from traditional subcarrier-intensity modulated schemes is the fact that the "subcarriers" originate from wavelengths that are separated far apart and not modulated together in the transmitter.

Transmitter Multi-Wavelength Optical Source

The transmitter multi-wavelength source may be coherent or incoherent. Here we define "coherent" to mean having a known, consistent phase relationship.

Coherent Multi-Wavelength Sources

Figure 4:
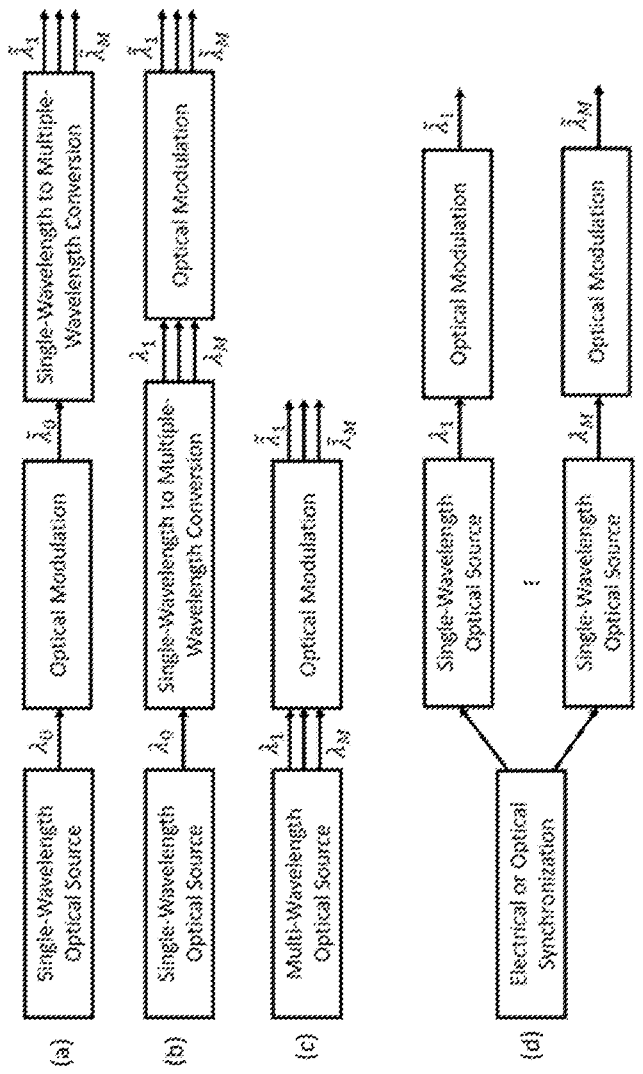
FIG. 4 is a block diagram illustrating an example, non-limiting embodiment of options for generation of coherent modulated multi-wavelength signals for FSOC architectures in accordance with various aspects described herein.

In FIG. 4, we show various methods of generating a coherent transmitter multi-wavelength source. In FIG. 4*a*, a single-wavelength source (e.g., a laser) is optically modulated. This modulation can be such as with an electro-optic modulator, or can be direct, such as with current-based modulation. The modulated signal is then input to a wavelength conversion device. Some devices that perform this action are frequency comb generators based on either the $\chi^{(2)}$ or $\chi^{(3)}$ nonlinearities in optical materials (EO resonator combs, EO cascaded combs, Kerr combs, optical parametric oscillator, etc.) or resonators. Each of the resulting wavelengths contains similar modulation. Similarly, as shown in FIG. 4*b*, modulated wavelengths can be generated by first converting a single-wavelength source to multiple wavelengths and then modulated the signals, either in the same waveguide or in different waveguides.

In FIG. 4*c*, the multiple wavelengths are not generated with a single-wavelength optical source but rather are generated initially through another mechanism. For example, this could be achieved via a mode-locked laser or a gain-switched laser. The wavelengths are then optically modulated individually or separately.

In FIG. 4*d*, we highlight that multiple single-wavelength sources can be synchronized to be coherent. The electrical or optical synchronization could be achieved with optical injection locking or an optical phase locked loop. Once the single-wavelength lasers are coherently related, the wavelengths are modulated with the same or similar information either individually or in the same waveguide.

Incoherent Multi-Wavelength Sources

Figure 5:
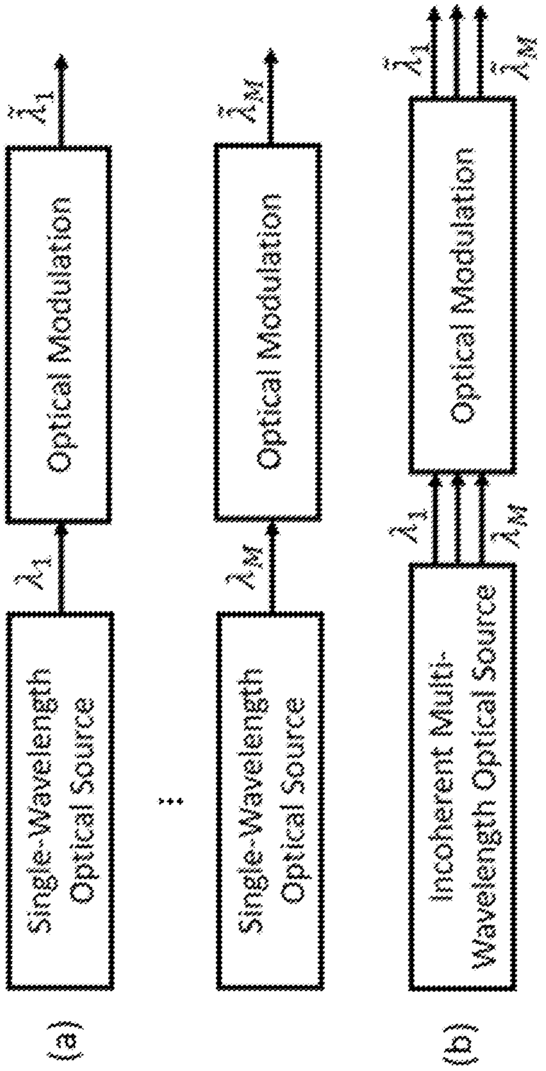
FIG. 5 is a block diagram illustrating an example, non-limiting embodiment of options for generation of incoherent modulated multi-wavelength signals for FSOC architectures in accordance with various aspects described herein.

Incoherent sources of multiple wavelengths can still be used in this configuration, though it shifts complexity to the receiver-side (per-wavelength fast phase tracking may be required). FIG. 5 shows several options. In FIG. 5*a*, multiple single-wavelength sources (e.g., lasers) are modulated individually or in the same waveguide. Importantly, because the sources are not phase-related, their carrier phase and frequencies will need to be tracked separately. In FIG. 5*b*, a multi-wavelength source that does not have predictable phase relationships between the wavelengths is then optical modulated. Examples of this include some mode-locked laser sources or electro-optically modulated combs with high modulation phase noise.

Subcarrier-Modulated Multi-Wavelength Sources

Figure 6:
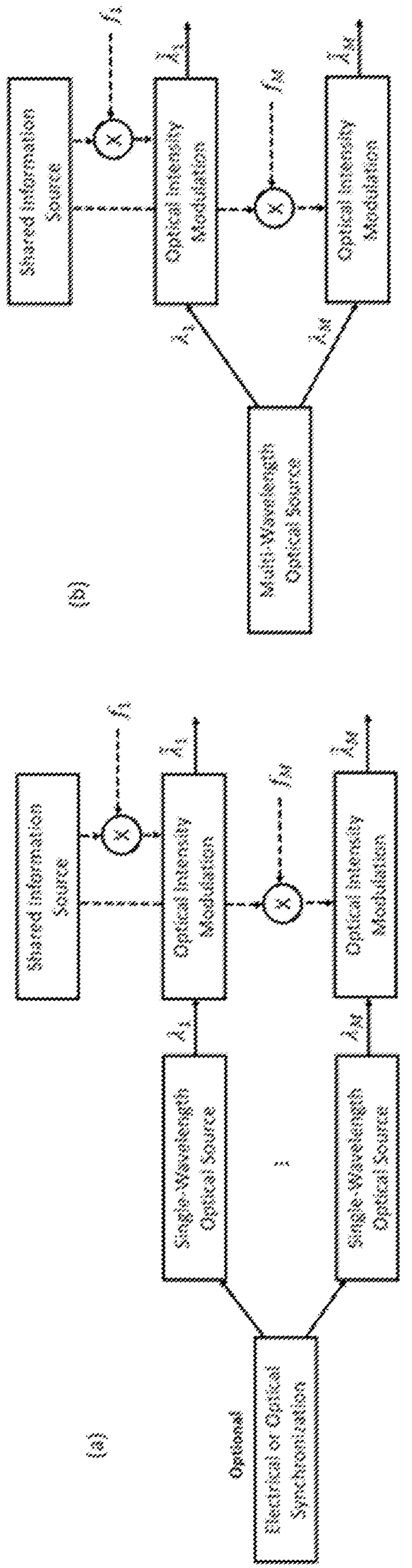
FIG. 6 is a block diagram illustrating an example, non-limiting embodiment of options for generation of subcarrier intensity modulated multi-wavelength signals for FSOC architectures in accordance with various aspects described herein.

For the incoherent multi-wavelength approach, it is necessary to modulated separate wavelengths with the same or similar information with different electrical carrier frequencies. FIG. 6 demonstrates two ways to achieve this. In FIG. 6*a*, a coherent or incoherent multi-wavelength source is generated from single-wavelength optical sources. Each of these wavelengths is then subcarrier-intensity modulated with the same or similar information. In FIG. 6*b*, a coherent or incoherent multi-wavelength source is generated and modulated in a similar fashion to FIG. 6*a*.

Multi-Wavelength Optical Detection

In the architectures presented here, multiple wavelengths are detected simultaneously in a single detector. The detection may be based on coherent detection or intensity detection. In both cases, it is necessary that the optical detectors be responsive at the desired wavelengths. Similarly, optical devices intended for multi-wavelength usage may need to be designed to support the wavelengths under operation.

Coherent Optical Hybrid

Coherent detection may occur in a coherent optical hybrid whereby the phase, amplitude, or both are detected and converted to electrical signals. The hybrid may support multiple polarizations, may be homodyne or heterodyne, and may support single- or dual-quadrature detection.

Optical Intensity Detection

Intensity detection may occur in a single optical detector or multiple optical detectors designed for specific wavelengths. Typically, a photodiode is used, though avalanche photodetectors or single photon avalanche diodes may be used.

Receiver Multi-Wavelength Optical Source

Similar to the transmitter multi-wavelength source, the receiver local oscillator multi-wavelength source can be either coherent or incoherent. If the source is incoherent, additional processing is required on the processor in order to phase-align the wavelengths with the received signal wavelengths.

Coherent Multi-Wavelength Sources

Figure 7:
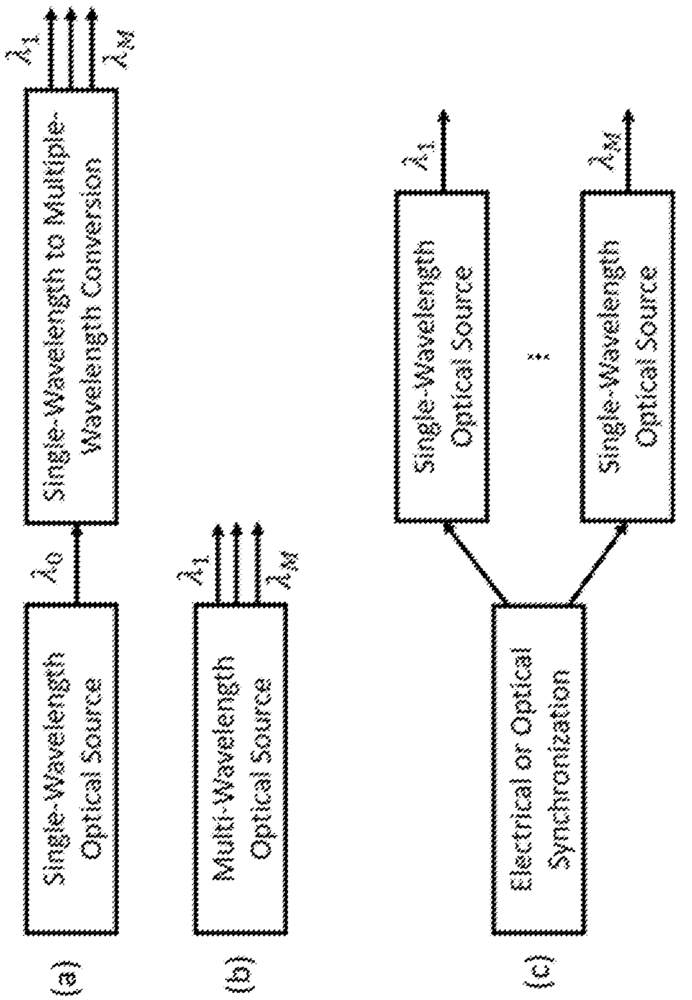
FIG. 7 is a block diagram illustrating an example, non-limiting embodiment of options for generation of coherent receiver local oscillator multi-wavelength signals for FSOC architectures in accordance with various aspects described herein.

FIG. 7 shows various options for receiver local oscillator multi-wavelength sources. In FIG. 7*a*, a single-wavelength source is input into a device that converts the single wavelength into multiple coherent wavelengths. This could be achieved via the methods such as those used in FIGS. 4*a* and 4*b*. In FIG. 7*b*, a coherent multi-wavelength optical source could be used, similar to FIG. 4*c*. In FIG. 7*c*, multiple single-wavelength sources are used to generate the coherent multi-wavelength optical signal, in a similar fashion to FIG. 4*d*. A preferred implementation would be to generate transmitter and receiver multi-wavelength sources to each other.

Incoherent Multi-Wavelength Sources

Figure 8:
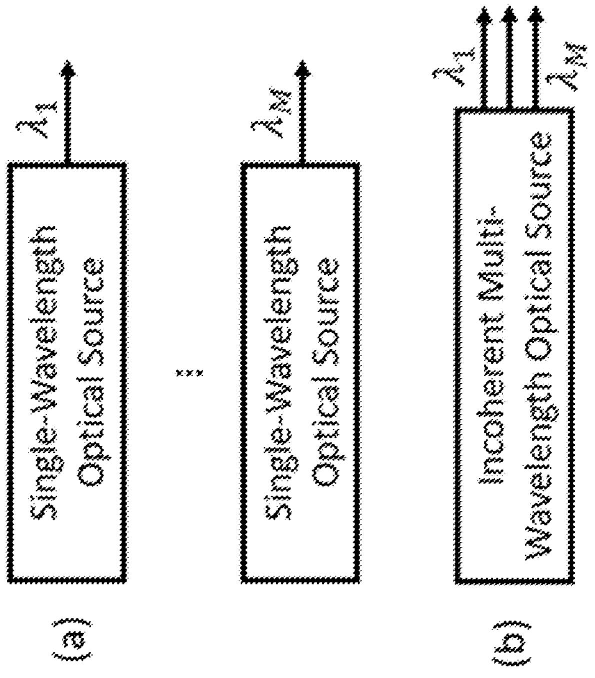
FIG. 8 is a block diagram illustrating an example, non-limiting embodiment of options for generation of incoherent receiver local oscillator multi-wavelength signals for FSOC architectures in accordance with various aspects described herein.

Similarly, incoherent multi-wavelength sources can be used as the receiver local oscillator. FIG. 8 shows the general ways in which this can be achieved. FIG. 8*a* shows a method of generating multiple wavelengths incoherently by using multiple single-wavelength sources, with methods such as in FIG. 5*a*. FIG. 8*b* shows a method of generating incoherent wavelengths with an incoherent multi-wavelength optical source, which could be accomplished with similar methods to FIG. 5*b*.

Modem and Control Architecture

Figure 9:
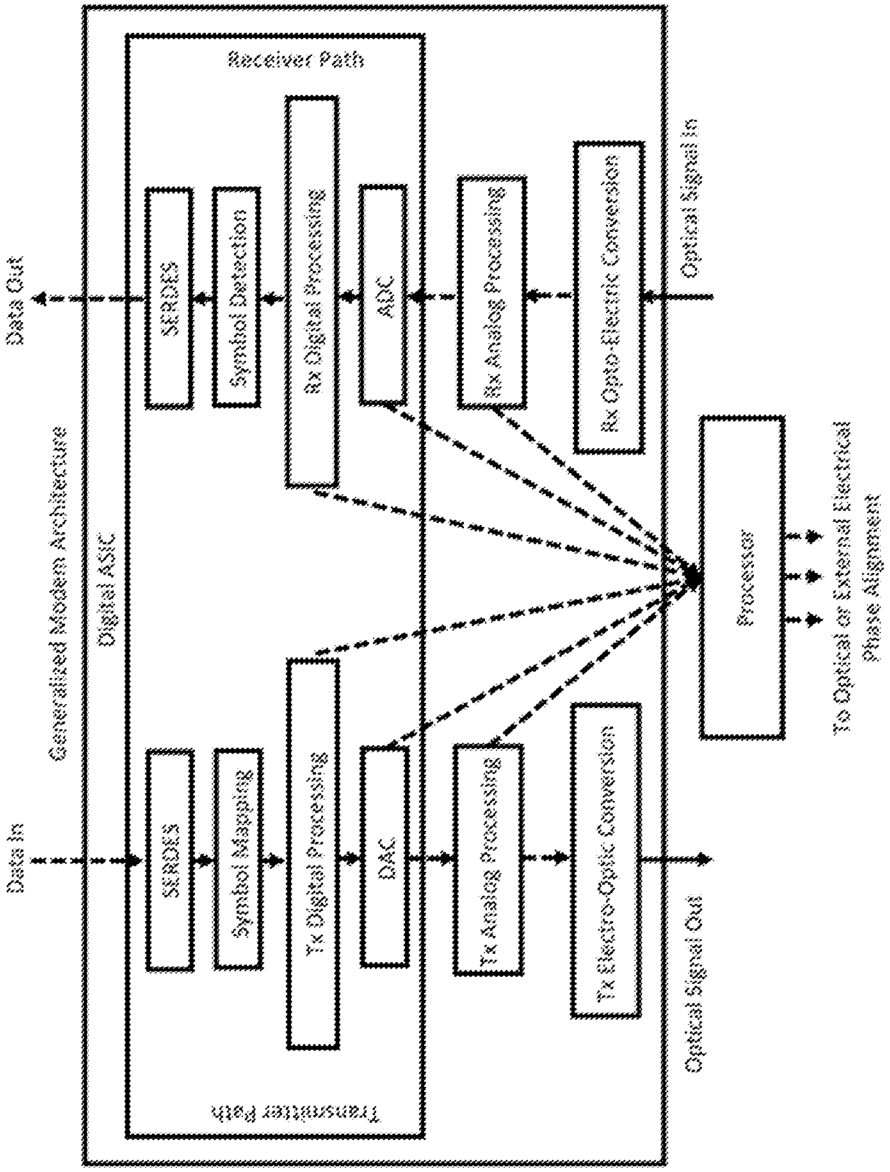
FIG. 9 is a block diagram illustrating an example, non-limiting embodiment of a Coherent Modem Architecture for FSOC Architecture Implementation in accordance with various aspects described herein.

A general schematic of a modem is shown in FIG. 9. The modem architecture shown is for a typical bi-directional implementation, which is compatible with the FSOC architectures shown before, where only one of the paths is explicitly shown. The modem can use coherent or direct detection, though the signal flow for a coherent modem is shown in FIG. 9. Note that a subcarrier-capable modem is shown here, though a single-carrier modem is similar, lacking the subcarrier splitting and combining blocks. Diagnostic information or raw samples are sent to an processor. On the processor, the streamed data can be processed to determine important diagnostic information for phase alignment. One example of a diagnostic that can be read is the signal-to-noise-ratio of a particular data stream. This diagnostic information can be exported to an optical or electrical phase alignment stage. The processor then outputs control signals to the phase alignment stage.

Figure 10:
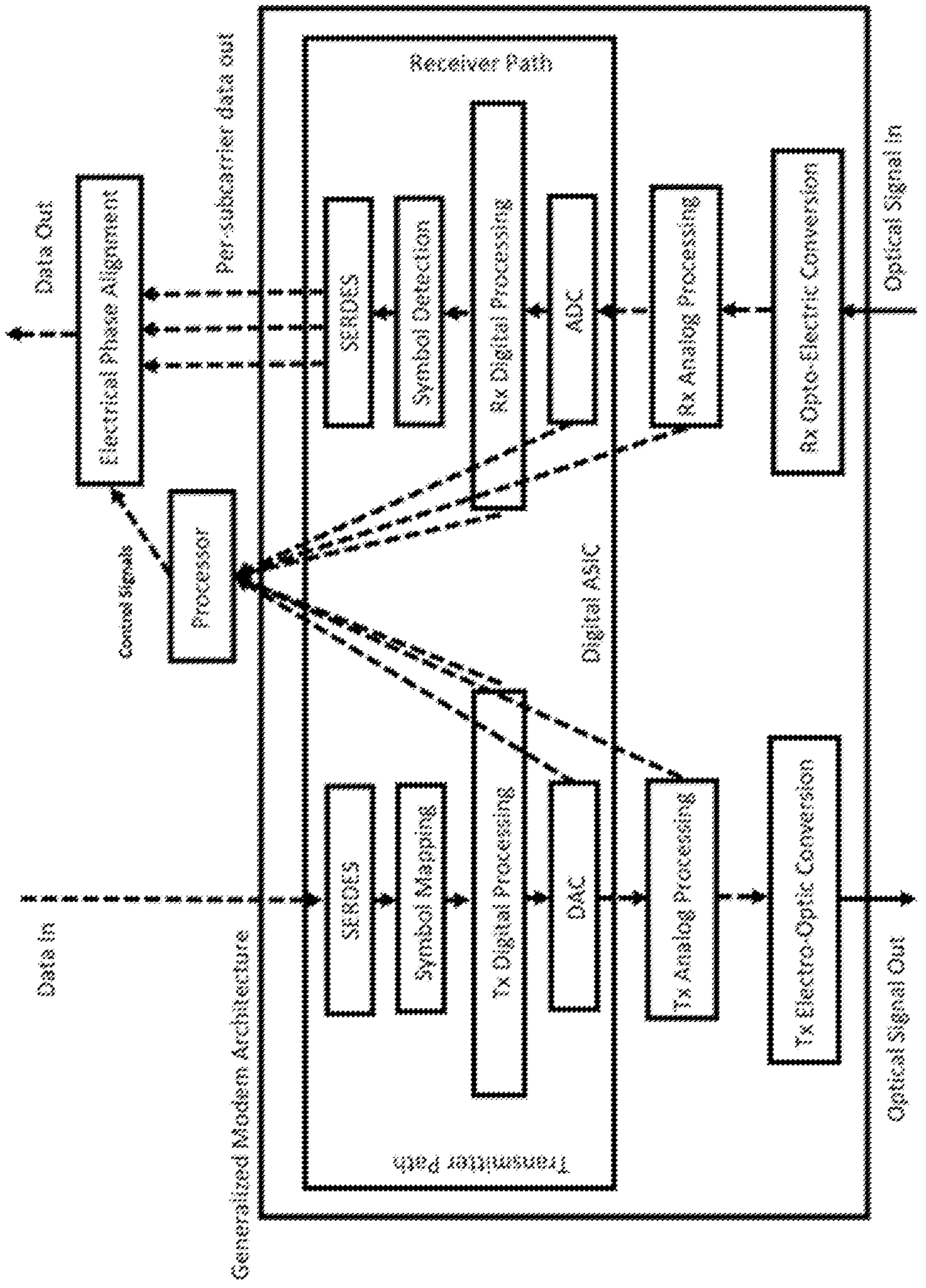
FIG. 10 is a block diagram illustrating an example, non-limiting embodiment of a Modem Architecture for Intensity Detection Subcarrier-Based Wavelength-Diverse FSOC Architecture Implementation in accordance with various aspects described herein.

FIG. 10 shows another modem design for subcarrier-based intensity detection. Here, information is sent to the processor in a similar manner to FIG. 9. The processor takes in per-subcarrier data and performs the electrical phase alignment. Although symbol detection is shown in the modem block, it is also possible to align the data on a per-sample basis before symbol detection, in which case symbol detection would be performed after the electrical alignment stage.

Fast Frequency and Phase Alignment (Joint Coherent Vs Incoherent)

Generally, the transmitter multi-wavelength optical sources will have some fast frequency and phase noise that will need to be tracked by the receiver local oscillator wavelengths. For multi-wavelength sources that are coherent, it is possible to use a single tracking loop such as an optical phase-locked loop to track the frequency and phase of the input carriers. For incoherent multi-wavelength sources, the frequency-tracking may need to be parallelized. For coherent sources, phase and frequency tracking can be accomplished inside the modem, with feedback to the local oscillator multi-wavelength source.

Multi-Wavelength Source Frequency Alignment

In several described implementations, it is possible to generate multiple wavelengths with a fixed spacing between them (typically in the frequency domain). If such a source is used in both the transmitter and receiver then it is possible to align all of the wavelengths used for wavelength diversity by tracking the frequency spacing between wavelengths (in addition to the absolute wavelength of one of the input wavelengths). For example, if using a resonator-based optical frequency comb, the free-spectral range of the resonator typically determines the frequency spacing, but the transmitter and receiver comb generators may differ slightly due to fabrication tolerances. Moreover, the size of the ring may change based on external factors such as temperature. By tracking the frequency spacing of the received multi-wavelength source, a control signal can be sent to the receiver local oscillator multi-wavelength source to align the transmitted and received frequency spacing to ensure efficient overlap in the coherent hybrid.

Slow Frequency and Phase Alignment

Thermal drift, pressure, and importantly, turbulence can change the relative phases of the received wavelengths. If a joint coherent fast phase and frequency tracking is used, then fast phase fluctuations for each of the receiver wavelengths are corrected, but slower-scale wavelength-dependent phases are not. This necessitates additional frequency and phase alignment, which are detailed in the following section.

Phase Alignment Architectures

Optical Phase Alignment

Figure 11:
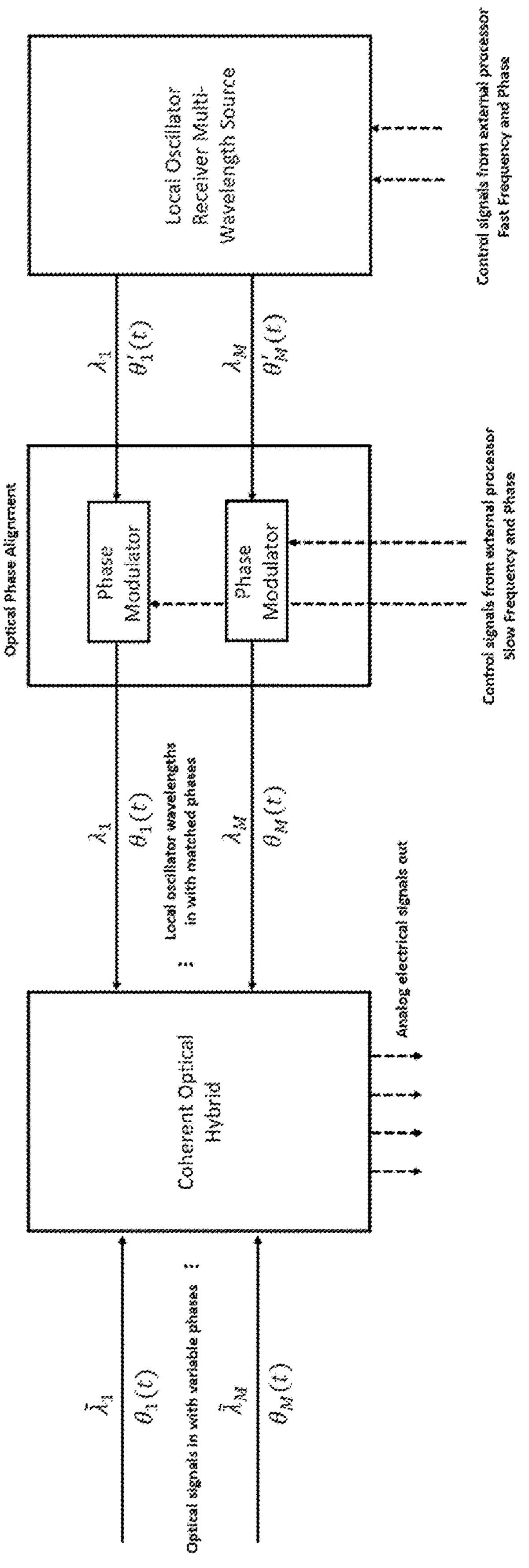
FIG. 11 is a block diagram illustrating an example, non-limiting embodiment of a Generalized Optical Phase Alignment for Coherent Optical Detection in accordance with various aspects described herein.

FIG. 11 shows a general optical phase alignment stage. Control signals from the processor are sent to a bank of phase modulators, which adjust the phase of the wavelengths based on a phase alignment algorithm (next section). Phase modulation can be accomplished by a variety of methods including tunable filters, arrayed waveguide gratings with phase shifters, thermos-optic phase shifters, electro-optic phase shifters, meshes of phase shifters. This architecture assumes that fast phase and frequency is compensated by feedback from the processor to the local oscillator multi-wavelength source.

Electrical Phase Alignment

Figure 12:
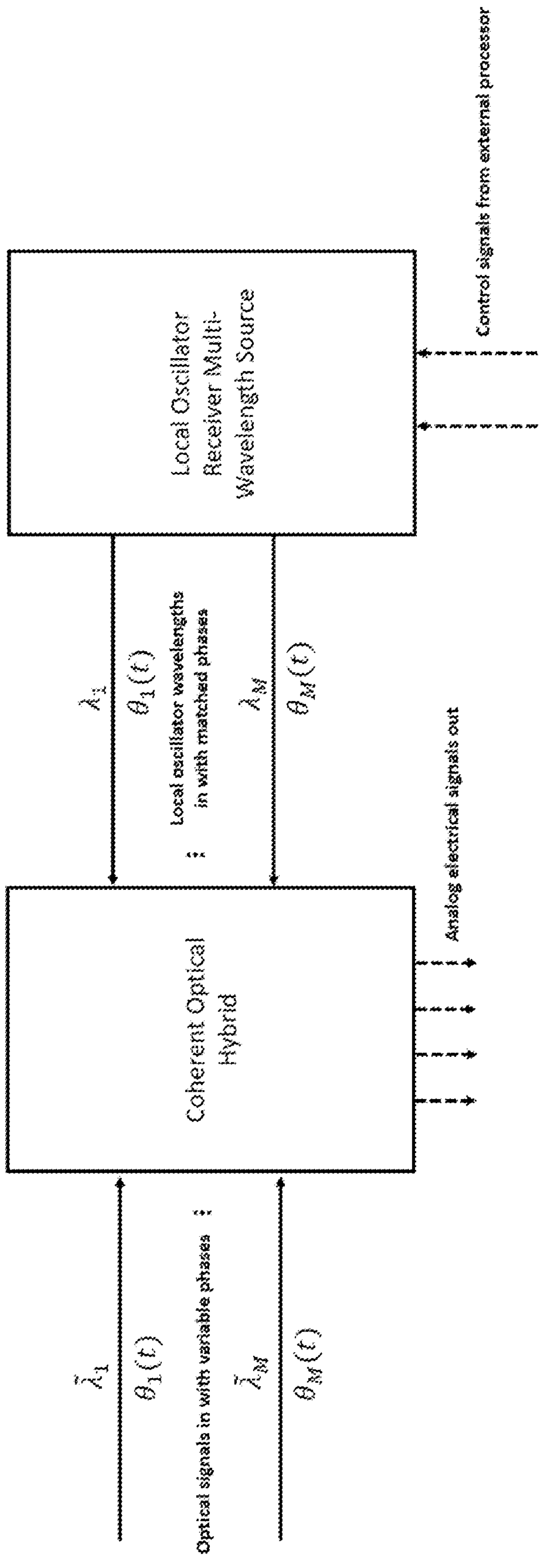
FIG. 12 is a block diagram illustrating an example, non-limiting embodiment of a Generalized Electrical Phase Alignment for Coherent Optical Detection in accordance with various aspects described herein.

FIG. 12 demonstrates an all electrical phase alignment stage. In some multi-wavelength sources, such as cascaded electro-optic modulators, it is possible to tailor the phase and frequency of the optical signals in the electrical domain. Here we show a system that takes control signals from the processor corresponding to both slow and fast frequency/phase tracking.

Phase Alignment Algorithms

As shown in FIG. 9, the processor takes in information from the modem, which can either be streamed sampled signals or per-subcarrier diagnostic information (or both) and makes a decision on which wavelengths are phase aligned correctly and which wavelengths need their phases to be tuned.

The phase alignment algorithm may include an acquisition phase, where a known set of symbols is transmitted. During operation, the processor may overlay a low-speed low-amplitude dither to the phase modulators to determine the mean phase direction to apply. Similarly, pilot tones can be sent on various wavelengths and extracted in the Tx filtering and processing stage in order to align different wavelengths.

The phase alignment dithers or pilot tones can be implemented either electrically in the transmitter or optically by wavelength demultiplexing and multiplexing. Wavelength (de)multiplexing options include AWGs, free-space filtering, or single-waveguide ring-resonator/busses. Additionally, a pilot tone or dither can be applied in the multi-wavelength source generation process. For some multi-wavelength processes, a dither applied on the input wavelength can "cascade" to other wavelengths but exist at a higher harmonic or other portion of the baseband frequency spectrum. This is one way to "tag" specific wavelengths in the receiver with a pilot tone or dither.

Combination with Other Diversity Techniques

The techniques here can also be combined with other turbulence mitigation techniques including:

Time diversity: TD can be accomplished either optically or electrically through the delay of identical or similar waveforms either electrically or optically. One example of this is by applying an optical delay line for separate wavelengths in the above architectures in both the transmitter and receiver. The optical delay line could be accomplished with spools of optical fiber and optical fiber amplifiers. By time-delaying signals that traverse the same turbulence, temporal correlation of the atmosphere can be mitigated. In simpler words, atmospheric fading events that happen on shorter time scales can be avoided by transmitting the same or similar information sequentially. In the digital domain, forward error correction can be used over multiple wavelengths to increase the tolerance to bit errors.

Spatial diversity: Many known techniques exist to mitigate the effects of atmospheric turbulence by utilizing uncorrelated or partially correlated optical paths. For example, multiple transmitter or receiver apertures can be used to reduce the likelihood of a time-correlated fading event. At the receiver, adaptive optics can be used to correct for interfering spatial modes before entering an aperture. These techniques are compatible with the multi-wavelength architecture presented here.

Figure 13:
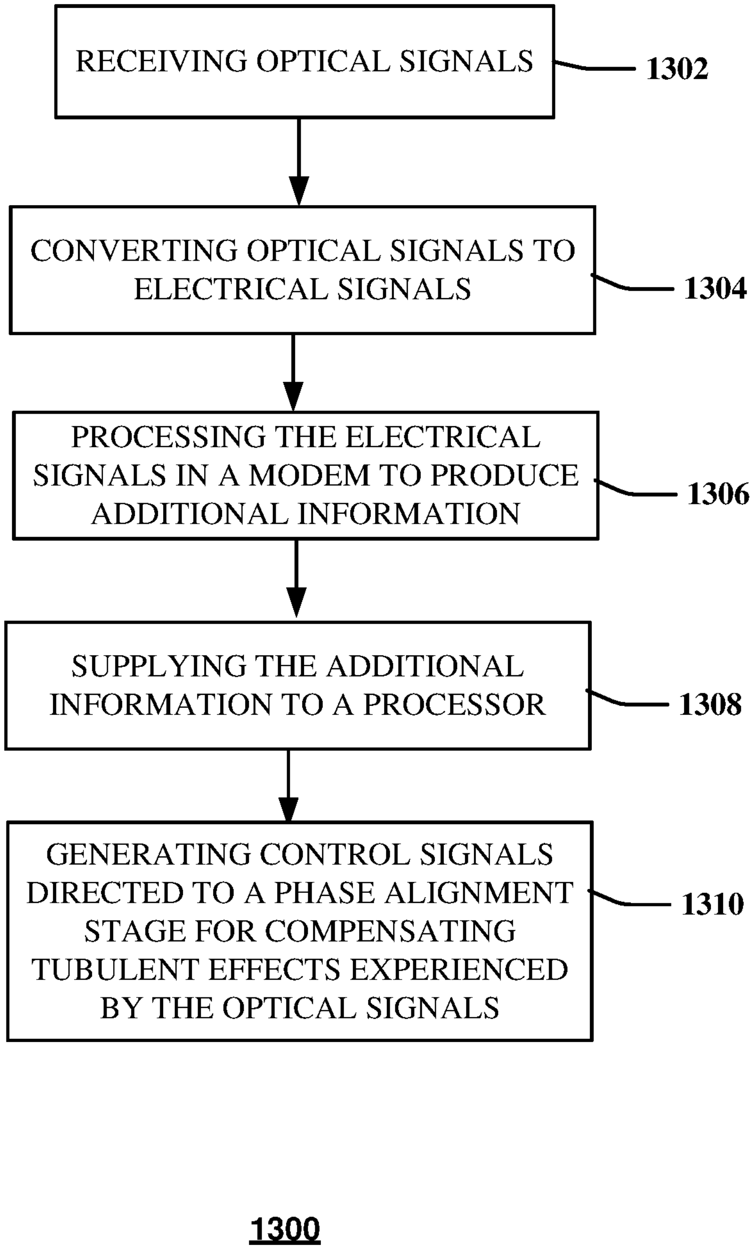
FIG. 13 depicts an illustrative embodiment of a method for a wavelength-diverse optical communication link in accordance with various aspects described herein.

FIG. 13 depicts an illustrative embodiment of a method 1300 for a wavelength-diverse optical communication link in accordance with various aspects described herein. Method 1300 can begin at step 1302 by receiving optical signals. The optical signals can be generated by a transmitter that generates multiple optical wavelengths, and modulates the multiple optical wavelengths from digital input data to create correlated optical signals. The transmitter can be further configured to transmit the correlated optical signals across a transmission medium having characteristics of a turbulent channel. At step 1304, the optical signals are converted to electrical signals. The electrical signals are processed at step 1306 in a modem to produce output data and additional information. The additional information is supplied at step 1308 to a processor, which generates at step 1310 one or more control signals directed to a phase alignment stage for compensating turbulent effects experienced by the optical signals while propagating through the turbulent channel.

While for purposes of simplicity of explanation, the respective processes are shown and described as a series of blocks in FIG. 13, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein. Additionally, method 1300 can be adapted by the embodiments that follow below.

In one embodiment, the additional information comprises signal-to-noise ratio of the electrical signals, modulation error ratio of the electrical signals, error vector magnitude of the electrical signals, bit error ratio of the electrical signals, Q factor of the electrical signals, power of the electrical signals, noise calculation of the electrical signals, a portion of the electrical signals, or combinations thereof.

In one embodiment, the transmitter is further configured to modulate the multiple optical wavelengths with one or more additional signals, wherein at least a portion of the one or more additional signals is included in the additional information generated by the modem, and wherein the additional information enables the processor to identify each of the multiple optical wavelengths.

In one embodiment, the processor identifies each of the multiple optical wavelengths from the additional information based on pilot signals, pilot symbols, dithers or combinations thereof inserted in the correlated optical signals.

In one embodiment, the processor identifies each of the multiple optical wavelengths from the additional information based on dithering applied by the processor to the one or more control signals, extraction by the processor of pilot signals, pilot symbols, or dithers included in the additional information, or combinations thereof.

In one embodiment, the multiple optical wavelengths are generated by a single-wavelength input, wherein the single-wavelength input comprises in a Kerr resonator frequency comb, electro-optic resonant comb, a cascaded electro-optic frequency comb, or combinations thereof.

In one embodiment, the multiple optical wavelengths are generated by a multi-wavelength mode-locked laser, gain-switched laser or a combination thereof.

In one embodiment, the multiple optical wavelengths are generated by separate single-wavelength sources.

In one embodiment, the multiple optical wavelengths are coherent.

In one embodiment, the multiple optical wavelengths are incoherent.

In one embodiment, the modulation of the multiple optical wavelengths is performed according to both phase and amplitude.

In one embodiment, the modulation of the multiple optical wavelengths is performed according to intensity modulation.

In one embodiment, the single-wavelength source generates a plurality of optical signals that are modulated and thereafter converted to the multiple optical wavelengths.

In one embodiment, the single-wavelength source generates a plurality of optical signals that are converted to the multiple optical wavelengths and thereafter modulated.

In one embodiment, an additional electrical frequency shift is applied to the modulation of each wavelength of the multiple optical wavelengths.

In one embodiment, the transmission medium is a terrestrial optical link.

In one embodiment, the transmission medium is a ground to low-earth orbit link.

In one embodiment, the transmission medium is a space-to-space link.

In one embodiment, the transmission medium is an underwater link.

In one embodiment, the transmitter has a single transmitter aperture, wherein the single transmitter aperture transmits one or more multiple optical modes.

In one embodiment, the transmitter has multiple transmitter apertures.

In one embodiment, the correlated optical signals are routed through the multiple transmitter apertures configured as an optical phased array or in a manner of coherent optical beam combining.

In one embodiment, the correlated optical signals are time-delayed to introduce time diversity with optical delay lines.

In one embodiment, the modulation of the multiple optical wavelengths is time-delayed via analog or digital delays to introduce time-diversity.

In one embodiment, the optical signals are received via a single receiver aperture, and wherein the single receiver aperture receives one or more multiple optical modes.

In one embodiment, the optical signals are received via multiple receiver apertures.

In one embodiment, the optical signals from the multiple receiver apertures are optically combined via feedback from the processor to improve signal quality through spatial diversity techniques including equal gain combining, selective combining, maximal ratio combining, or combinations thereof.

In one embodiment, the optical signals from each receiver aperture of the multiple receiver apertures are processed and converted to electrical signals separately and then combined electrically to improve signal quality through spatial diversity techniques including equal gain combining, selective combining, maximal ratio combining, or combinations thereof.

In one embodiment, the optical signals are time-delayed to compensate for the optical delays in the transmitter and to achieve time diversity.

In one embodiment, additional analog or digital delays are applied to the multiple optical wavelengths to compensate for the time-delayed modulation.

In one embodiment, the optical to electrical conversion is performed according to a combination of the received optical signals with a local oscillator optical signal in an optical hybrid to produce the electrical signals, and wherein the local oscillator optical signal comprises other multiple optical wavelengths and is generated by an unmodulated multi-wavelength optical source.

In one embodiment, the optical to electrical conversion is performed according to intensity detection, the intensity detection including a photodiode, an Avalanche Photo Diode (APD), a Single Photon Avalanche Diode (SPAD), or combinations thereof.

In one embodiment, the other multiple optical wavelengths are generated in a similar fashion to a method used to generate the multiple optical wavelengths.

In one embodiment, the other multiple optical wavelengths are generated according to a different method than a technique used by the transmitter to generate multiple optical wavelengths, the technique comprising at least one of the aforementioned embodiments.

In one embodiment, the other multiple optical wavelengths are aligned with the received optical signals via the one or more control signals being directed to the unmodulated multi-wavelength optical source, which could be accomplished with tailoring of electrical drive signals to cascaded electro-optic modulators.

In one embodiment, the other multiple optical wavelengths are aligned with the received optical signals via the one or more control signals from the processor sent to the unmodulated multi-wavelength optical source as well as an optical phase alignment stage.

In one embodiment, the modem processes the electrical signals coherently.

In one embodiment, the modem processes the electrical signals as intensity-detected signals.

In one embodiment, the additional information comprises analog or digital information, and wherein the modem outputs the analog or digital information from any of the modem subsystem blocks or raw samples from a DAC or ADC of the modem.

In one embodiment, the analog or digital information includes per-subcarrier data information.

In one embodiment, a first portion of the one or more controls signals are configured for fast phase alignment of the received optical signals to compensate for phase noise of the received optical signals, and wherein a second portion of the one or more controls signals are configured for slow phase alignment of the received optical signals to compensate for atmospheric effects caused by the turbulent channel on the received optical signals.

In one embodiment, the fast phase alignment between the received optical signals and the local oscillator optical signal is accomplished with an optical phase locked loop.

In one embodiment, the fast phase alignment between the received optical signals and the local oscillator optical signal is accomplished with optical injection locking.

In one embodiment, the fast phase alignment is performed according to independent control signals of the one or more control signals on each wavelength of the local oscillator optical signal.

In one embodiment, the fast phase alignment is performed by at least one control signal of the one or more control signals applied to multiple wavelengths of the local oscillator optical signal.

In one embodiment, the fast phase alignment is performed by tracking the frequency spacing between wavelengths of the received optical signals and fast phase noise of at least one wavelength in the received optical signals.

In one embodiment, the phase alignment stage comprises an optical phase alignment module, an unmodulated multi-wavelength optical source, an electrical phase alignment module or combinations thereof.

In one embodiment, the electrical phase alignment module performs digital phase alignment, analog phase alignment or a combination thereof.

In one embodiment, entropy of the additional information is greater than 1 giga bits per second.

In one embodiment, the additional information supplied to the processor is digital information.

In one embodiment, a bit-rate of the additional information is greater than 10 giga bits per second.

In one embodiment, a bit-rate of the additional information is greater than 100 giga bits per second.

In one embodiment, latency of the additional information is less than 10 microseconds.

In one embodiment, latency of the additional information is less than 1 microsecond.

In one embodiment, latency of the additional information is less than 10 nanoseconds.

In one embodiment, latency of the additional information is less than 1 nanosecond.

In one embodiment, the wavelength-diverse optical communication link is bidirectional.

In one embodiment, portions of the wavelength-diverse optical communication link are configured for wavelength diversity, spatial diversity, time diversity, or combinations thereof.

In one embodiment, an apparatus can comprise a processing system including a processor; and a memory that stores executable instructions that, when executed by the processing system, facilitate performance of operations, comprising receiving optical signals, wherein the optical signals are generated by a transmitter, wherein the transmitter generates multiple optical wavelengths, wherein the transmitter modulates the multiple optical wavelengths from digital input data to create correlated optical signals, and wherein the transmitter transmits the correlated optical signals across a transmission medium having characteristics of a turbulent channel; converting of the optical signals to electrical signals; processing of the electrical signals in a modem to produce output data and additional information; supplying the additional information to a processor; and based on the additional information, the processor generating one or more control signals directed to a phase alignment stage for compensating turbulent effects experienced by the optical signals while propagating through the turbulent channel.

In one embodiment, a machine-readable medium, can comprise executable instructions that, when executed by a processing system including a processor, facilitate performance of operations, comprising receiving optical signals, wherein the optical signals are generated by a transmitter, wherein the transmitter generates multiple optical wavelengths, wherein the transmitter modulates the multiple optical wavelengths from digital input data to create correlated optical signals, and wherein the transmitter transmits the correlated optical signals across a transmission medium having characteristics of a turbulent channel; converting of the optical signals to electrical signals; processing of the electrical signals in a modem to produce output data and additional information; supplying the additional information to a processor; and based on the additional information, the processor generating one or more control signals directed to a phase alignment stage for compensating turbulent effects experienced by the optical signals while propagating through the turbulent channel.

What is claimed is:

1. An apparatus comprising:

circuitry facilitating performance of operations, comprising receiving optical signals from a transmission medium having characteristics of a turbulent channel, wherein a transmitter generates multiple optical wavelengths, modulates the multiple optical wavelengths from digital input data to create correlated optical signals, and transmits the correlated optical signals across the transmission medium that produces the optical signals;

converting of the optical signals to electrical signals to enable processing the electrical signals in a modem that produces output data and additional information, wherein the converting is performed according to a combination of the received optical signals with a local oscillator optical signal in an optical hybrid to produce the electrical signals or according to intensity detection, wherein the local oscillator optical signal comprises other multiple optical wavelengths, and wherein the other multiple optical wavelengths are generated by a same or a different method of generation of the multiple optical wavelengths; and based on the additional information, generating one or more control signals directed to a phase alignment stage at the apparatus for compensating at least in part turbulent effects experienced by the optical signals while propagating through the turbulent channel, wherein the compensating performed by the phase alignment stage improves conversion of the optical signals into at least one electrical signal by aligning phases associated with the optical signals, and wherein the other multiple optical wavelengths are aligned to the multiple optical wavelengths using the additional information, the one or more control signals, the phase alignment stage, or a combination thereof.

2. The apparatus of claim 1, wherein the additional information comprises signal-to-noise ratio of the electrical signals, modulation error ratio of the electrical signals, error vector magnitude of the electrical signals, bit error ratio of the electrical signals, Q factor of the electrical signals, power of the electrical signals, noise characteristics of the electrical signals, a portion of the electrical signals, or combinations thereof.

3. The apparatus of claim 1, wherein the transmitter is further configured to modulate the multiple optical wavelengths with one or more additional signals, the one or more additional signals including pilot signals, pilot symbols, pilot frequency tones, frequency shifts, dithers or combinations thereof, wherein at least a portion of the one or more additional signals is included in the additional information generated by the modem.

4. The apparatus of claim 3, wherein the operations further comprise identifying each of the multiple optical wavelengths from the additional information based on dithering applied to the one or more control signals, extraction of pilot signals, pilot symbols, pilot frequency tones, or dithers included in the additional information, or combinations thereof.

5. The apparatus of claim 1, wherein the multiple optical wavelengths are generated by one or more single-wavelength sources, one or more multi-wavelength sources, one or more nonlinear wavelength generators, or combinations thereof, wherein the multiple optical wavelengths are coherent or incoherent.

6. The apparatus of claim 1 wherein a single wavelength source is modulated to generate a modulated signal wavelength source, and wherein the multiple optical wavelengths are generated from the modulated signal wavelength source.

7. The apparatus of claim 1 wherein the modulation of the multiple optical wavelengths by the transmitter is performed according to both phase and amplitude modulation or according to intensity modulation.

8. The apparatus of claim 1 wherein the transmission medium is a ground to ground optical link, a ground to air link, a ground to space link, an air to air link, an air to space link, a space to space link, an underwater link, a link through bulk liquids or solids, or any combinations thereof.

9. The apparatus of claim 1, wherein the transmitter includes one or more apertures and the one or more apertures transmit the correlated optical signals via one or more transmitted spatial optical modes.

10. The apparatus of claim 1 wherein the correlated optical signals are time-delayed when transmitted across the transmission medium with optical delay lines, analog electrical delay lines, digital electrical delay lines, or combinations thereof.

11. The apparatus of claim 1 wherein the receiving of the optical signals is performed with one or more apertures, wherein the one or more apertures collect one or more received spatial optical modes, wherein the one or more received spatial optical modes are combined optically or electrically through equal gain combining, selective combining, maximal ratio combining, or combinations thereof.

12. The apparatus of claim 1 wherein the additional information comprises analog or digital information obtained from one or more optical modem subsystem blocks or raw samples from a Digital to Analog Converter (DAC) or Analog to Digital Converter (ADC), wherein the analog or digital information includes per-subcarrier data information.

13. The apparatus of claim 1, wherein the phase alignment stage compensates for fast phase misalignment from phase noise of the multiple optical wavelengths or slow phase misalignment from turbulent effects, or combinations thereof, wherein the fast phase misalignment is compensated via tracking of the multiple optical wavelengths via an optical phase locked loop or optical injection locking, or combinations thereof, wherein the control signals contain information associated with phase, frequency, frequency separation, or combinations thereof of one or more of the multiple optical wavelengths.

14. The apparatus of claim 1, wherein the phase alignment stage comprises an optical phase alignment module, an unmodulated multi-wavelength optical source, an electrical phase alignment module or combinations thereof, wherein the electrical phase alignment module performs digital phase alignment, analog phase alignment or a combination thereof.

15. The apparatus of claim 1, wherein entropy of the additional information is greater than 1 giga bits per second, wherein latency of the additional information is less than 10 microseconds.

16. The apparatus of claim 1, wherein the transmission medium comprises a wavelength-diverse optical communication link, wherein the wavelength-diverse optical communication link includes two or more counter-propagating optical links, wherein the control signals for phase alignment include second additional information from the counter-propagating optical links, and wherein portions of the wavelength-diverse optical communication link are configured for wavelength diversity, spatial diversity, time diversity, or combinations thereof.

17. A method, comprising:

receiving optical signals from a transmission medium having characteristics of a turbulent channel, wherein a transmitter generates multiple optical wavelengths, modulates the multiple optical wavelengths from digital input data to create correlated optical signals, and transmits the correlated optical signals across the transmission medium that produces the optical signals;

converting of the optical signals to electrical signals to enable processing the electrical signals in a modem that produces output data and additional information, wherein the converting is performed according to a combination of the received optical signals with a local oscillator optical signal in an optical hybrid to produce the electrical signals or according to intensity detection, wherein the local oscillator optical signal comprises other multiple optical wavelengths, and wherein the other multiple optical wavelengths are generated by a same or a different method of generation of the multiple optical wavelengths; and based on the additional information, generating one or more control signals directed to a phase alignment stage for compensating at least in part turbulent effects experienced by the optical signals while propagating through the turbulent channel, wherein the compensating performed by the phase alignment stage improves coherent summing of the electrical signals by reducing turbulent effects in the optical signals, and wherein the other multiple optical wavelengths are aligned to the multiple optical wavelengths using the additional information, the one or more control signals, the phase alignment stage, or combinations thereof.

18. A machine-readable medium, comprising executable instructions that, when executed by circuitry, facilitate performance of operations, comprising:

receiving optical signals from a transmission medium having characteristics of a turbulent channel, wherein a transmitter generates multiple optical wavelengths, modulates the multiple optical wavelengths from digital input data to create correlated optical signals, and transmits the correlated optical signals across the transmission medium that produces the optical signals;

converting of the optical signals to electrical signals to enable processing the electrical signals in a modem that produces output data and additional information; and processing the additional information to generate one or more control signals directed to a phase alignment stage for compensating at least in part turbulent effects experienced by the optical signals while propagating through the turbulent channel, wherein the compensating performed by the phase alignment stage improves coherent summing of the electrical signals by reducing turbulent effects in the optical signals, wherein entropy of the additional information is greater than 1 giga bits per second, and wherein latency of the additional information is less than 10 microseconds.

19. The method of claim 17, wherein the additional information comprises signal-to-noise ratio of the electrical signals, modulation error ratio of the electrical signals, error vector magnitude of the electrical signals, bit error ratio of the electrical signals, Q factor of the electrical signals, power of the electrical signals, noise characteristics of the electrical signals, a portion of the electrical signals, or combinations thereof.

20. The method of claim 17, wherein the transmission medium is a ground to ground optical link, a ground to air link, a ground to space link, an air to air link, an air to space link, a space to space link, an underwater link, a link through bulk liquids or solids, or any combinations thereof.

* * * * *